US009028327B2

(12) United States Patent
Brown

(10) Patent No.: US 9,028,327 B2
(45) **Date of Patent: *May 12, 2015**

(54) COMBINATION CASINO KIOSK AND NOTIFICATION RESULT RESPONDER DEVICE AND METHOD THEREFOR

(71) Applicant: Vincent Brown, Las Vegas, NV (US)

(72) Inventor: Vincent Brown, Las Vegas, NV (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/827,343

(22) Filed: Mar. 14, 2013

(65) Prior Publication Data

US 2013/0337905 A1 Dec. 19, 2013

Related U.S. Application Data

(63) Continuation-in-part of application No. 12/950,025, filed on Nov. 19, 2010, now Pat. No. 8,398,482.

(60) Provisional application No. 61/263,098, filed on Nov. 20, 2009.

(51) Int. Cl.
*G06F 17/00* (2006.01)
*G07F 17/32* (2006.01)

(52) U.S. Cl.
CPC .......... *G07F 17/3241* (2013.01); *G07F 17/323* (2013.01); *G07F 17/329* (2013.01)

(58) Field of Classification Search
CPC .................................................. G07F 17/3218
USPC .................................... 463/16, 20, 25, 40–42
See application file for complete search history.

(56) References Cited

U.S. PATENT DOCUMENTS

| | | | | |
|---|---|---|---|---|
| 2009/0048022 | A1 * | 2/2009 | Iddings et al. | 463/42 |
| 2013/0203489 | A1 * | 8/2013 | Lyons | 463/30 |
| 2013/0203490 | A1 * | 8/2013 | Hilbert et al. | 463/30 |
| 2014/0087880 | A1 * | 3/2014 | Betts et al. | 463/42 |

* cited by examiner

*Primary Examiner* — Ronald Laneau
(74) *Attorney, Agent, or Firm* — Cardinal Law Group

(57) ABSTRACT

A gaming system has a gaming machine. The gaming machine transmits a signal to a remote device indicating a winning round.

15 Claims, 6 Drawing Sheets

COMBINATION CASINO KIOSK AND NOTIFICATION RESULT RESPONDER DEVICE AND METHOD THEREFOR

CLAIM FOR PRIORITY

This application a continuation-in-part of U.S. Patent Application Ser. No. 2011/0287840 A1, filed Nov. 19, 2010, in the name of the same inventor, and entitled, "COMBINATION CASINO KIOSK AND NOTIFICATION DEVICE" and is related to U.S. Provisional Application Ser. No. 61/263,098, filed Nov. 20, 2010 and is hereby incorporated into the present application. The present application further claims the benefit of the aforementioned provisional and non-provisional applications.

FIELD OF THE INVENTION

The present invention relates generally to a casino kiosk and, more specifically, to a casino kiosk for allowing a customer to play numerous casino games at the same time, the kiosk issuing a notification signal to inform the customer if the customer has won even if the customer is not in the vicinity of the casino kiosk.

BACKGROUND OF THE INVENTION

Presently, there are many different wagering games used in gambling establishments. The problem with most of these games is twofold. First, the customer needs to remain at the gaming machine/gaming table to play. If a customer leaves a table or machine, the customer generally has no ability to continue to play. While the customer may ask a friend to continue to wager, the customer has no ability to actually control his/her friend's actions. Further, once a customer leaves a gaming table/machine, the customer generally loses his/her spot and is unable to continue to play.

Second, in general, a customer can only play one casino game at a time. It would be extremely difficult for a customer to move among two or more casino tables/machines even if the casino tables/machines are next to one another. Another issue with many casino wagering games are that many casino games are difficult to understand. This relates to not only how to play the casino game but also the strategy involved in playing. Thus, many people who would normally like to play and gamble end up not playing.

Therefore, it would be desirable to provide a system and method to overcome the above problem.

SUMMARY OF THE INVENTION

A gaming system has a gaming machine. The gaming machine transmits a signal to a remote device indicating a winning round.

A gaming system has a gaming kiosk. The gaming kiosk has an input device for selecting a casino game to be played via the gaming kiosk, gaming rounds to be played, and game criteria. A transmitter device is provide for transmitting game notification signals to a remote device to indicate one of a winning or losing round by a player.

One embodiment relates to a method for voting using a gaming system including a kiosk, wherein the kiosk includes an input device for selecting a casino game to be played via the gaming kiosk, gaming rounds to be played, and game criteria; and a dispenser for distributing a result responder and a transmitter device for transmitting game notification signals to at least the result responder to indicate at least one of a winning or losing round by a player, the gaming system having software stored on a computer-readable medium which, when loaded and run by the processor. The method causes the processor to perform the steps of qualifying at least one voter to vote using the gaming system; enabling the at least one voter to enter at least one initiative on at least one ballot; and providing more than one confirmation of the at least one voter.

Another embodiment relates to a method for voting using a gaming system comprising a kiosk, wherein the kiosk comprises: an input device for selecting a casino game to be played via the gaming kiosk, gaming rounds to be played, and game criteria; and a dispenser for distributing a result responder; a transmitter device for transmitting game notification signals to at least the result responder to indicate at least one of a winning or losing round by a player, the gaming system having software stored on a computer-readable medium which, when loaded and run by the processor. The method causes the processor to perform the steps of registering the at least one voter to vote using the gaming system; qualifying at least one voter to vote using the gaming system; enabling the at least one voter to enter at least one initiative on at least one ballot; and providing at least two confirmations of the at least one voter.

Yet another embodiment relates to a method for gambling using a gaming system comprising a kiosk, wherein the kiosk comprises an input device for selecting a casino game to be played via the gaming kiosk, gaming rounds to be played, and game criteria; and a dispenser for distributing a result responder; a transmitter device for transmitting game notification signals to at least the result responder to indicate at least one of a winning or losing round by a player, the gaming system having software stored on a computer-readable medium which, when loaded and run by the processor. The method causes the processor to perform the steps of qualifying at least one player to gamble using the gaming system; enabling the at least one player to deposit money into a financial account; and enabling the at least one player to gamble using the gambling device.

In accordance with one embodiment, not departing from the spirit and scope of the present invention, embodiments of the invention may be used in a Mobile Live Video Stream Voting Kiosk Process and method. Alternatively, the Mobile Live Video Stream Voting Kiosk Process may be provided over the internet.

Embodiments of the invention may include a smart phone based voting application system that works with a web based content management system (CMS). It may be used simultaneously from multiple locations where the kiosk and the transmitter/responders positioned around a perimeter area where the kiosk is located.

This mobile live video stream voting kiosk embodiment streamlines the voting process by improving voting organization, participation, and enhancing data management. The mobile live video stream voting kiosk application ensures reliable, fast, and convenient voting/survey activities. It replaces manual voter verification with accurate automatic verification, and enhances voting verification accuracy and precision.

To be able to use the system Voters will have to go into an established voting poll station to sign up for the mobile live video stream voting kiosk application process. The application process requires verification having to show a government-issued photo ID for example. At the polling place, the Voters' signature will be compared to the signature on a voting card on file. If the signatures match, a registration agent will submit the Voter's information into a data base that qualifies the Voter to be able to cast a vote and use the voting kiosk app to follow votes on a phone.

At this time the Voter will be able to upload the mobile live video stream voting kiosk application web based CMS, data management and update applications. The applications automatically allow the Voter to access a protected CMS page on the web, where administrators can set the ballot for election positions and candidates running for those positions. The applications further allow the administrators to upload a voter list from pre-qualified registrants that will be compared with voter input on the Election Day for verification purposes.

On the day of election, qualified preregistered Voters can go to any place and location having a Mobile Live Video Stream Voting Kiosk. Once the Voter enters an identifier (a social security number or the like) into the Mobile Live Video Stream Voting Kiosk (alternatively referred to as a first confirmation), a standard typical ballot will greet the Voter. Next the Voter will see an electronic ballot that could depict virtual hanging chads or just hangs up with each name on the ballot having a unique alphanumeric code next to it. A1, for instance, could be George Bush, while A2 could be Al Gore.

After reviewing the ballot, the Voter may make a choice and vote by pressing the "Mobile Live Video Stream" button on the front of the Kiosk screen, which may be an LED screen, plasma screen, DLP screen, or the like. The listing of the above is provided as an example only and should not be seen in a limiting manner. In at least one embodiment, the Voter prints off the ballot and faces the camera holding up both the ballot and photo ID. An audible beep and an on-screen visual confirm the live stream is active, and a secondary visual confirms that the Voter's ID and ballot number have both been read via optical character and facial recognition (alternatively referred to as a second embodiment).

The features, functions, and advantages can be achieved independently in various embodiments of the disclosure or may be combined in yet other embodiments.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIG. 3A is a plan view of one embodiment of the notification device issued by the casino kiosk, while

DETAILED DESCRIPTION OF PRESENTLY PREFERRED EMBODIMENTS

Figure 1:
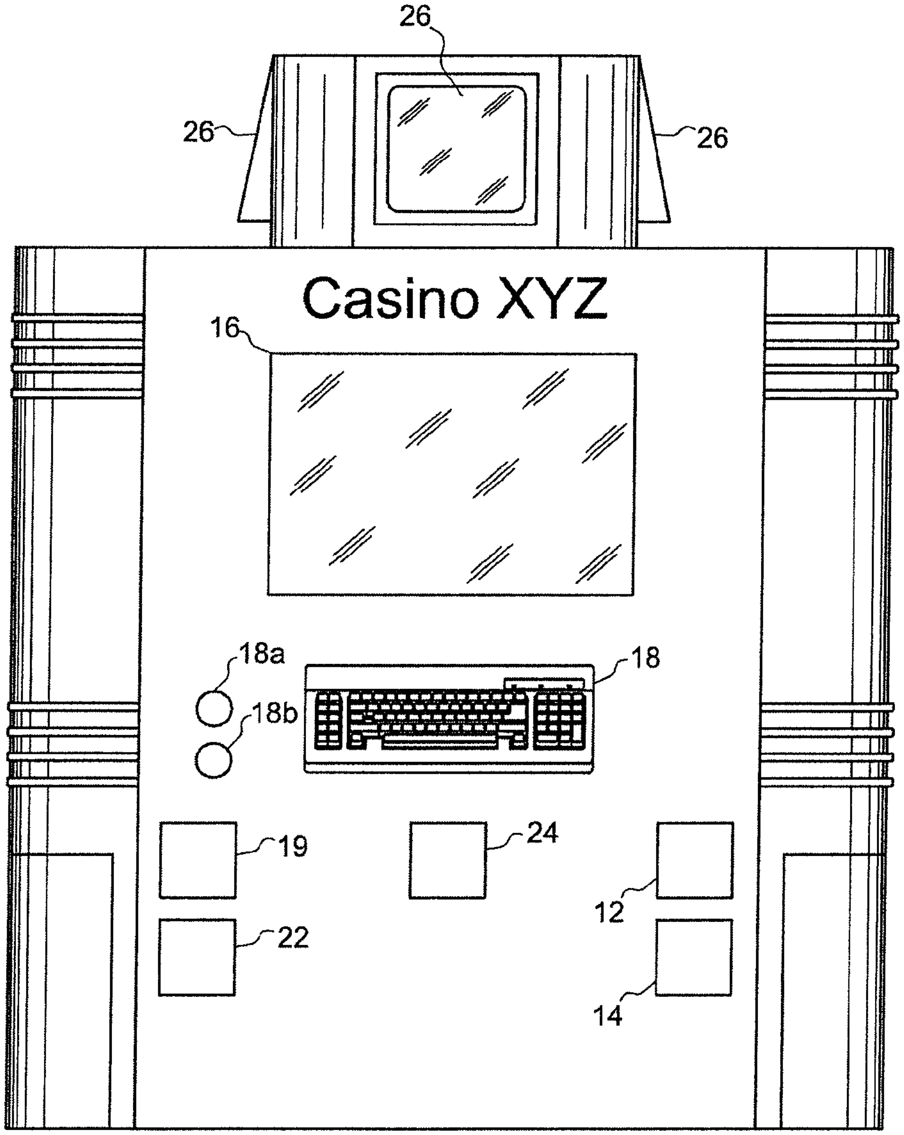
FIG. 1 is a perspective view of one embodiment of a casino kiosk of the present invention.

Referring to FIG. 1, an adjustable cycle saddle bag bracket assembly, generally designated 10, is depicted which is adapted to moveably, removably mount a saddle bag 94 (best viewed in FIG. 39) to a vehicle (a motor cycle for example). FIG. 1 depicts the bracket assembly 10 comprises at least one container attachment portion 12 adapted to receive the saddle bag 94 in a moveably, removable fashion. As illustrated, the bracket assembly 10 further comprises at least one, but generally two, attachment mounting portions, first or front attachment mounting portion 14 and the second or rear mounting portion 16 moveably, removably mounted to the container attachment portion 12.

Referring to FIG. 1, a casino kiosk 10 is shown. The casino kiosk 10 allows a customer to select a plurality of casino games to play at a predetermined time. The customer will then be notified if he/she has won anything once the casino game has been played.

The casino kiosk 10 is a free standing unit. The casino kiosk 10 may have a card reader 12. The card reader 12 may be used to read a casino club card, a credit card, or the like. The casino kiosk 10 may also have a monetary intake device 14. The monetary intake device 14 may be used to insert currency into the casino kiosk 10. A user may insert a casino club card, a credit card, or the like into the card reader 12 or insert currency (paper or coins) into the monetary intake device 14 to play one or more casino games via the casino kiosk 10.

The casino kiosk 10 may have a first screen 16. The first screen 16 can be an LED screen, plasma screen, DLP screen, or the like. The listing of the above is given as an example and should not be seen in a limiting manner. The first screen 16 may be used to display gaming information to the customer. In accordance with one embodiment, the first screen 16 will show a main menu listing all the casino games that may be played on the casino kiosk 10. The user may select one or more games to play by using an input device 18. The input device 18 may be a keyboard, a mouse, roller ball, or the like. The listing of the above is given as an example and should not be seen in a limiting manner. Alternatively, the first screen 16 may be a touch screen. The user may select one or more games to play by touching a desired location on the first screen 16.

The casino kiosk 10 may allow a customer to play casino games such as roulette, keno, bingo, and the like. Other games such as poker, twenty-one, and the like may also be played. The listing of the above casino games should not be seen in a limiting scope.

Once a person selects a game to be played, the first screen 16 may show different playing options on the first screen 16 as will be disclosed below. Once the playing options are entered, the customer will be issued a notification device 20 (FIG. 3) which is dispensed by the casino kiosk 10 via a dispensing device 19. The notification device 20 will inform the customer if he or she has won. Thus, the customer may leave the casino kiosk 10 area and still be informed if he/she has won. If the notification device 20 informs the customer that he/she has won, the customer may return to the casino kiosk 10 and insert the notification device 20 into a reader 22. The reader 22 will determine if the customer is holding a winning notification device 20. If so, the casino kiosk 10 will issue either the monetary winnings or a voucher to turn into a cashier via a payout device 24.

Alternatively, once a person selects a game to be played, and the playing options are entered, the customer may enter a telephone number via the input device 18. The kiosk 10 may then send a signal to the telephone number entered to inform the customer if he or she has won. Thus, the customer may leave the casino kiosk 10 area and still be informed if he/she has won. In accordance with one embodiment, a text message is sent to a cellular phone 60 (See FIG. 6) of the customer to inform the customer that he/she has won. The text message may include information such as the round the customer won, the dollar figure the customer has won, etc. The text message may further include a security number which the customer may be required to enter in order to receive his/her winnings.

If the customer receives a signal on his/her cellular telephone 60 of a winning round, the customer may return to the casino kiosk 10 to collect his/her winnings. The customer may enter his/her telephone number. The customer may further be required to enter the security number. The above information is entered into the kiosk 10 via the input device 18. Once the information is entered, the kiosk 10 will verify the information to determine if the customer had a winning round. If so, the casino kiosk 10 will issue either the monetary winnings or a voucher to turn into a cashier via a payout device 24.

The casino kiosk 10 may have a second screen 26. The second screen 26 may be placed on a top area of the casino kiosk 10. The second screen 26 may be an LED screen, plasma screen, DLP screen, or the like. The listing of the above is given as an example and should not be seen in a limiting manner. The second screen 26 may be used to show a current casino gaming being played. While the embodiment shown in FIG. 1 shows only one side of the casino kiosk 10, it should be noted that each side of the casino kiosk 10 may have the features shown in FIG. 1. This may allow the casino kiosk 10 to have multiple customers using the casino kiosk 10 at the same time.

Figure 2:
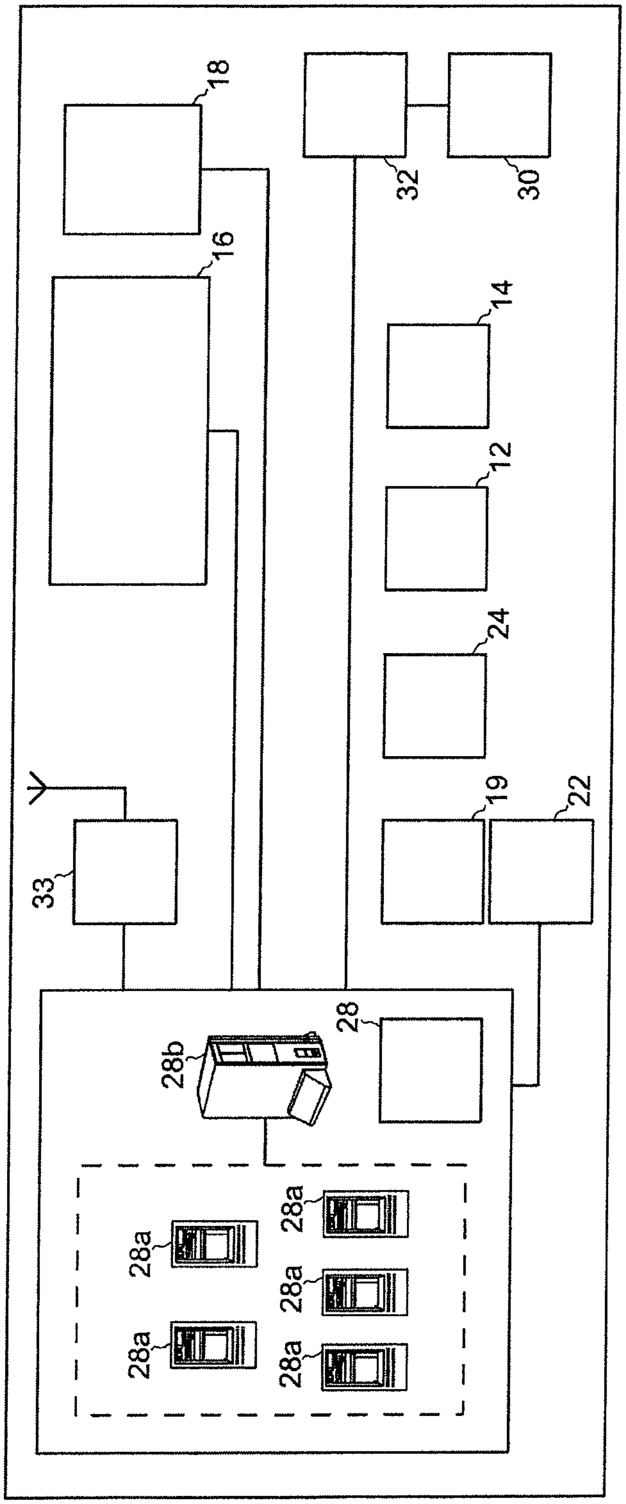
FIG. 2 is a block diagram of one embodiment of the circuitry of the casino kiosk shown in FIG. 1.

Referring to FIGS. 1 and 2, a simplified block diagram of the casino kiosk 10 is shown. As stated above, the casino kiosk 10 may have a card reader 12 to read a casino club card, a credit card, or the like; a monetary intake device 14 to insert currency into the casino kiosk 10; a first screen 16 to display gaming information to the customer; an input device 18; a dispensing device 19 for dispensing a notification device 20 by the casino kiosk 10; a reader 22 to scan a notification device 20 to determine if the customer holding a winning notification device 20 is a winner; a payout device 24; a second screen 26.

The casino kiosk 10 may have a gaming CPU 28. The gaming CPU is used to control the casino kiosk 10. The gaming CPU is used to control all of the different casino games that may be played on the casino kiosk 10. Alternatively, the CPU 28 may be replaced by a plurality of game servers 28A. Each game server 28A may be used to control a particular casino game of the casino kiosk. Each game server 28A may be coupled to additional casino kiosks 10. This may allow multiple casino kiosks 10 to be linked together which may allow for progressive jackpots to be awarded for the different casino games based on casino selected criteria. If game servers 28A are used, then the game servers 28A may be stored in secure area of the casino and coupled to a gaming server 28B in the casino kiosk 10.

The CPU 28 or the game servers 28A may be coupled to the first screen 16. The first screen 16 will display a menu of all of the casino games that may be played via the casino kiosk 10. The customer may select multiple casino games to play. Each game will function in a different manner as described below. In general, each casino game will allow a customer to play a designated number of rounds. The customer may select how to wager in each round. This information is then programmed onto a notification device 20 by the casino kiosk 10.

As shown in FIG. 2, the casino kiosk 10 may have a storage unit 30. The storage unit 30 may be used to house a plurality of the notification devices 20. A read write device 32 will program a designated notification device 20 with the designated casino game, round, and wager information. This information as well as an identification number of the designated notification device 20 may be stored in a memory of the CPU 28 or the game servers 28A. The casino kiosk 10 may then dispense the notification device 20 to the customer. Once a round has been played for each casino game, the CPU 28 or the game server 28A may determine if there is a winning wager. If there is a winning wager, the casino kiosk 10 may send a signal to a winning notification device 20 indicating the winning wagers. In accordance with one embodiment, the CPU 28 or the game servers 28A or 28B may send a notification signal indicating a winning wager to a transmitting device 33. The transmitting device 33 may send a notification signal to a notification device 20 indicating the winning wagers.

Figure 5:
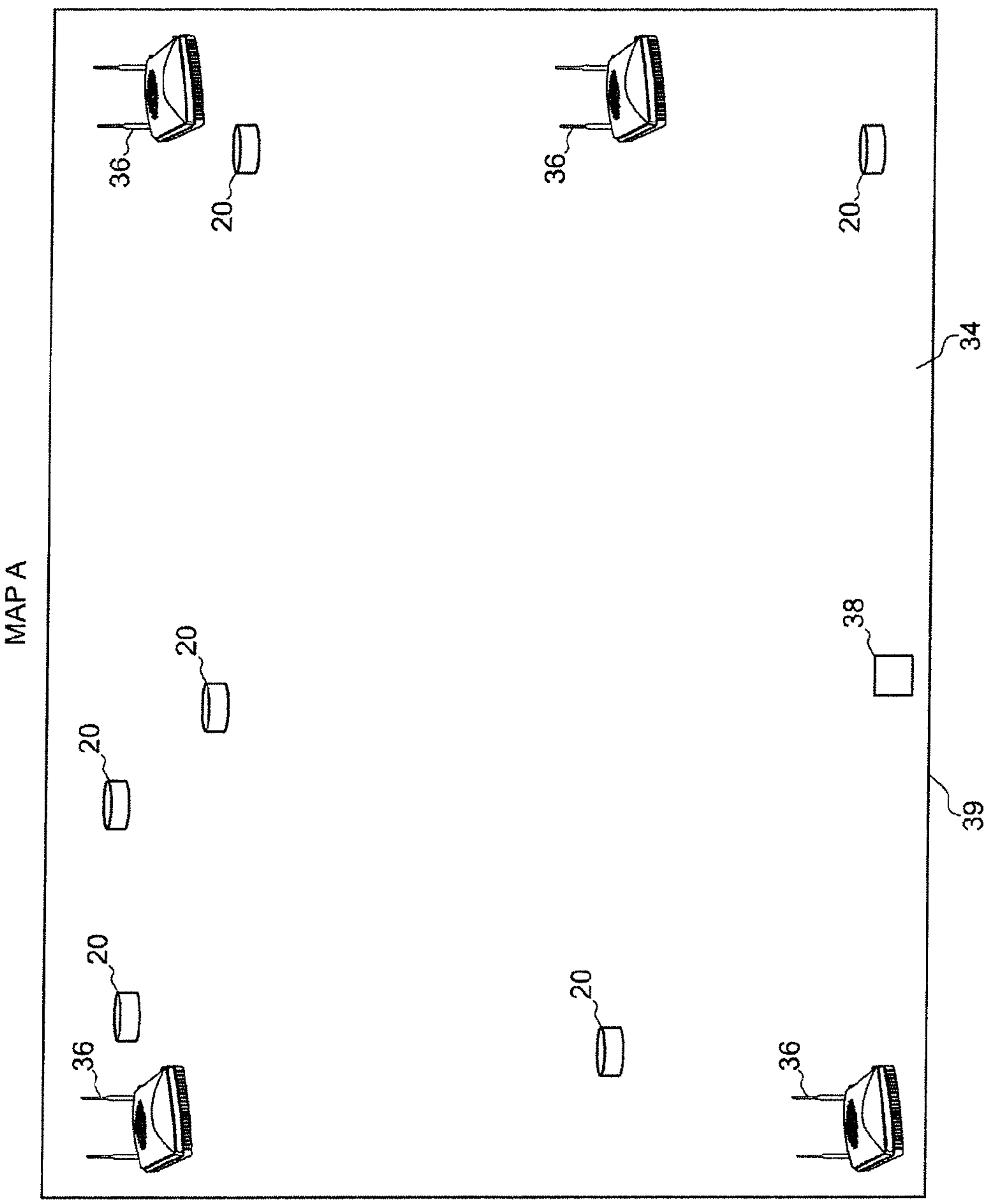
FIG. 5 is a block diagram of a casino floor using the present invention.

Referring to FIG. 5, in order to expand coverage, the casino floor area 34 may have a plurality of transmitter/receiver devices 36. The transmitter device 36 may be located around a perimeter of the casino floor area 34. While only four transmitter/receiver devices 36, this should not be seen in a limiting manner. The notification signal sent by the transmitting device 33 may be received by one or more of the transmitter/receiver devices 36 which transmits the notification signal over the casino floor area 34. As long as the notification device 20 is in range of one or more of the transmitter/receiver devices 36, the notification device 20 may receive the notification signal indicating the winning wagers.

In accordance with one embodiment, disabling device 38 may be positioned around the casino floor area 34. In accordance with one embodiment, the disabling device 38 may be positioned around exits 39 of the building housing the casino floor area 34. The disabling device 38 may deactivate the notification device 20 once a person passes the disabling device 38. Thus, a person who plays the casino kiosk 10 but leaves the building will not be notified if he/she wins.

Figure 3A:
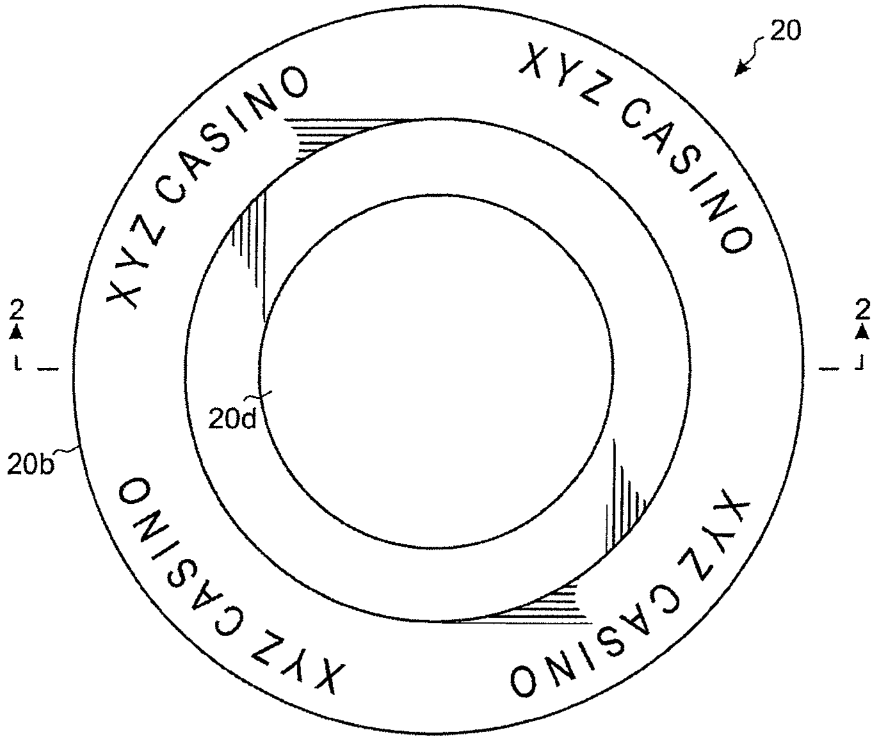
Figure 3B:
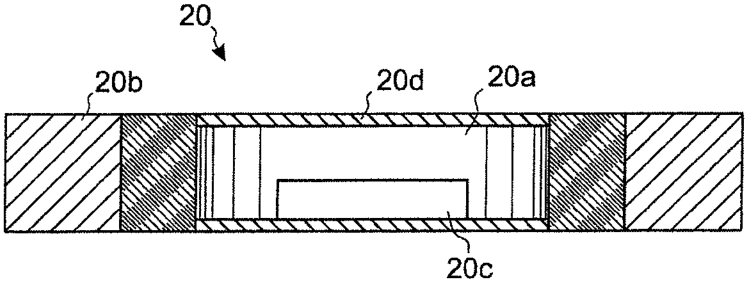
FIG. 3B is perspective view of one embodiment of the notification device issued by the casino kiosk taken along line 2-2 of FIG. 3A.
Figure 4:
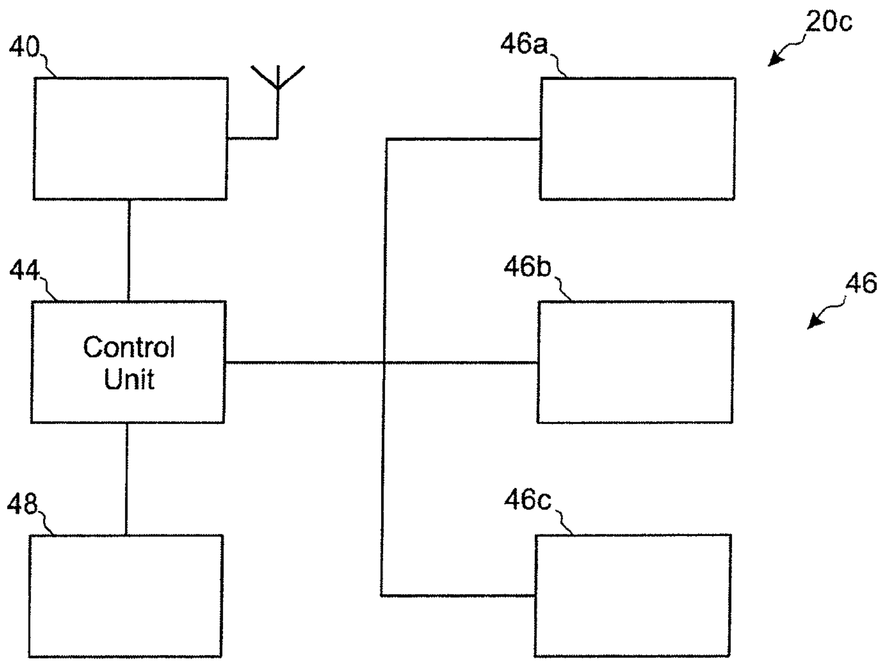
FIG. 4 is a block diagram of one embodiment of the circuitry of the notification device shown in FIG. 3A-B.

Referring now to FIGS. 3-4, one embodiment of the notification device 20 is shown. The notification device 20 may take on the form of a casino chip. In the present embodiment the notification device 20 is circular in shape. However, this is given as an example and should not be seen in a limiting scope. The notification device 20 may have a solid outer perimeter 20B. The solid outer perimeter 20B may be formed of plastic, wood, or other similar types of material. The notification device 20 may have a hollow interior section 20A. The hollow interior section 20A may be used to house a notification circuit 200. The notification circuit 20C may be used to inform the customer that he/she has a winning wager. The notification circuit 20C may provide visual, audible, and or a sensory indication of a winning wager.

The notification device 20 may have a clear or opaque surface 20D. In the present embodiment, a top and bottom center surface is clear or opaque. The clear or opaque surface 20D may be used to provide a visual indication by the notification circuit 20C of a winning wager.

As seen more clearly in FIG. 4, notification circuit 20C may have a receiver 40. The receiver 40 may have an antenna 42 coupled thereto. Alternatively, the receiver 40 may have a built-in antenna in the receiver 40. The receiver 40 in combination with the antenna 42 or the built-in antenna may be used to receive the notification signal transmitter by the transmitting device 32. The receiver 40 may be coupled to a controller 44. The controller 44 may be used to decode the notification signal received and to control the operation of the notification circuit 20C. The controller 44 may be coupled to one or more notification devices 46. The notification devices 46 may include but are not limited to: visual indicator 46A, audible indicator 46B, sensory indicator 46C and the like. The visual indicator 46A may be one or more lights. The lights may be light bulbs, LEDs, or the like. The one or more lights may illuminate, flash, or the like to indicate a winning wager. The audible indicator 46B may be one or more speakers or the like. The one or more speakers may be used to provide an audible indication of a winning wager. For example, the audible indicator 46B may beep if the customer has a winning wager. The sensory indicator 46C may be a vibrating unit such as a piezoelectric device or the like. The vibrating unit may be used to vibrate the notification device 20 to indicate a winning wager. The notification circuit 20C may be powered by a power source 48. The power source may be a battery such as a rechargeable battery, a lithium battery, or the like.

Referring now to FIGS. 1-5, in operation, the casino kiosk 10 may allow a customer to play casino games such as roulette, keno, bingo, and the like. Other games such as poker, twenty-one, and the like may also be played. Once a person enters insert a casino club card, a credit card, or the like into the card reader 12 or insert currency into the monetary intake device 14, the customer may play one or more casino games via the casino kiosk 10. The customer may press an input button 18A or 18B to select either a live casino game or a computer based casino game.

The customer may view the first screen 16 to select a game to be played. The first screen 16 will show different playing options based on the casino game selected. In general, for each casino game, the customer may select, the time period to play, a desired round to play and a wager option. In a live casino game, the customer will view a live casino game which is being played on the casino floor 34 and shown on the screens 16 and or 26. The customer may then select a particular round or time for playing. Alternatively, the customer may play the current round of the live casino game via the kiosk 10. The same is true if the user selects a computer based casino game.

Roulette

In a computer based roulette, the CPU 28 or the game servers 28A (hereinafter CPU 28) may control the roulette game. The CPU 28 will play a predetermined number of rounds each hour. Each round played may be shown on the second screen 26. Each round may also be shown on videos placed throughout the casino floor 34. When a customer decides to play, the customer will determine when the customer wants to play, how many rounds to play, and the different bets the customer wants to play. Thus, for example, the first screen may show the different times a customer may play. Once a user inputs a time (i.e., 1:00 pm), the customer will determine how many rounds he/she wishes to play. For example, in roulette each hour 12 rounds of roulette may be played (i.e., 1:00 pm, 1:05 pm, 1:10 pm, 1:15 pm, . . . 1:55 pm). The user may select the time and round(s) the customer wishes to play and inputs this information using the input device 18. The user will then input the wagers. In accordance with one embodiment, a roulette table may appear on the first screen 16. The user may then move the input device 18 to select wager locations and to enter a monetary wager for each location. Once this is done, the casino kiosk 10 may store the information in the memory of the CPU 28 or other memory of the casino kiosk 10. The information may be programmed onto a notification device 20. An identification number of the notification device 20 may be stored in the memory of the CPU 28 or other memory device along with the betting information. Once a round is played, the transmitter 33 will send out a notification signal of winner wagers for that particular round. The notification signal may further be received and resent via the transmitter/receiver devices 36. Winner notification devices 20 will receive the notification signal and send one of a visual, audible or sensory signal to indicate a winning wager.

In a live roulette game, the customer may have two different options. The customer may play a current round and input betting options on the first screen 16 via an input device 18. The CPU 28 will monitor winnings and credits remaining. The CPU 28 may have a lockout feature that prohibits betting once the current round has started or once the ball is placed on the roulette table. Alternatively, the customer will determine when the customer wants to play, how many rounds to play, and the different bets the customer wants to play. Thus, for example, the first screen may show the different times a customer may play. Once a user inputs a time (i.e., first full round starting at 1:00 pm), the customer will determine how many rounds he/she wishes to play. For example, the customer may input 10 rounds of roulette starting at 1:00 pm. The user inputs this information using the input device 18. The user will then input the wagers. In accordance with one embodiment, a roulette table may appear on the first screen 16. The user may then move the input device 18 to select wager locations and to enter a monetary wager for each location. Once this is done, the casino kiosk 10 may store the information in the memory of the CPU 28 or other memory of the casino kiosk 10. The information may be programmed onto a notification device 20. An identification number of the notification device 20 may be stored in the memory of the CPU 28 or other memory device along with the betting information. Once the live round is played, the transmitter 33 will send out a notification signal of winner wagers for that particular round. The notification signal may further be received and resent via the transmitter/receiver devices 36. Winner notification devices 20 will receive the notification signal and send one of a visual, audible or sensory signal to indicate a winning wager.

Bingo

In the computer bingo game, the CPU 28 may control the bingo game. The CPU 28 will play a predetermined number of rounds each hour. Each round played may be shown on the second screen 26 and or screens located throughout the casino floor 34. When a customer decides to play, the customer may determine when the customer wants to play, how many rounds to play, and the different bets the customer wants to play. Thus, for example, the first screen 16 may show the different times a customer may play. Once a user inputs a time (i.e., 1:00 pm), the customer will determine how many rounds he/she wishes to play. For example, in bingo each hour 5 rounds of bingo may be played (i.e., 1:10 pm, 1:20 pm, 1:30 pm, 1:40 pm, and 1:50 pm). The user may select the time and which round the customer wishes to play and inputs this information using the input device 18. The user may then select a bingo playing card. Different bingo playing cards may be displayed on the first monitor 16. Alternatively, the customer may be able to pick the numbers and locations of the numbers on a bingo card. Further, the casino kiosk 10 may select the bingo playing card. The user may then select different wager options. For example, the customer may select to wager to have the first winning bingo card, select bingo having a predefined pattern, and the like. Once this is done, the casino kiosk 10 may store the information in the memory of the CPU 28 or the game servers 28A. The information may be programmed onto a notification device 20. An identification number of the notification device 20 may be stored in the memory of the CPU 28 or other memory device of the casino kiosk 10 along with the betting information. Once a round is played, the transmitter 33 will send out a notification signal of winner wagers for that particular round. The notification signal may further be received and resent via the transmitter/receiver devices 36. Winner notification devices 20 will receive the notification signal and send one of a visual, audible or sensory signal to indicate a winning wager. A live bingo game works in the same manner but the live game is shown on the screens 16 and or 26. The user may stay at the kiosk 10 to watch and play or may leave with the notification device 20.

Keno

In the computer keno game, the CPU 28 may control the keno game. The CPU 28 will play a predetermined number of rounds each hour. Each round played may be shown on the second screen 26 or screens located throughout the casino floor 34. When a customer decides to play, the customer may determine when the customer wants to play, how many rounds to play, and the different bets the customer wants to play. Thus, for example, the first screen 16 may show the different times a customer may play. Once a user inputs a time (i.e., 1:00 pm), the customer will determine how many rounds he/she wishes to play. For example, in keno each hour 5 rounds of keno may be played (i.e., 1:10 pm, 1:20 pm, 1:30 pm, 1:40 pm, and 1:50 pm). The user may select the time and which round the customer wishes to play and input this information using the input device 18. The customer may then select the numbers he/she is wagering. The customer is paid based on how many numbers drawn match the numbers selected on the ticket and according to the paytable selected with regard to the wager amount. Alternatively, the casino kiosk 10 may select the numbers for the customer. Once this is done, the casino kiosk 10 may store the information in the memory of the CPU 28 or other memory device of the casino kiosk 10. The information may be programmed onto a notification device 20. An identification number of the notification device 20 may be stored in the memory of the CPU 28 or the game servers 28A along with the betting information. Once a round is played, the transmitter 33 will send out a notification signal of winner wagers for that particular round. The notification signal may further be received and resent via the transmitter/receiver devices 36. Winner notification devices 20 will receive the notification signal and send one of a visual, audible or sensory signal to indicate a winning wager. A live keno game works in the same manner but the live game is shown on the screens 16 and or 26. The user may stay at the kiosk 10 to watch and play or may leave with the notification device 20.

Other casino games may be played without departing from the spirit and scope of the present invention. For each casino game played on the casino kiosk 10, the first screen 16 may show the different questions and or decisions that the customer needs to answer. The answers are then used for different wager options.

Figure 6:
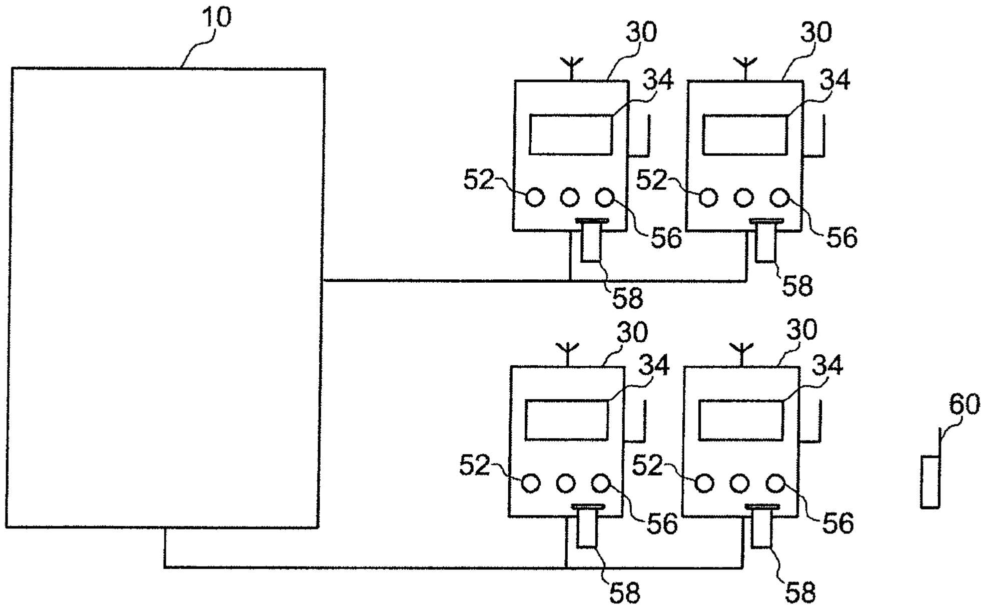
FIG. 6 is a block diagram of another embodiment of the present invention.

Referring now to FIG. 6, another embodiment of the present invention is shown. In this embodiment, a plurality of slot machines 50 may be coupled to the kiosk 10. Each slot machine 50 may be coupled to the kiosk 10 in different manners. For example, the slot machine 50 may be hard wired to the kiosk 10. Alternatively, the slot machine 50 may be wirelessly coupled to the kiosk 10. The above are given as examples and should not be seen in a limiting manner.

Anytime during the slot play by the customer, if the customer wants to take a chance gambling at Keno, Bingo, Roulette, or any of the games played on the kiosk 10, the customer presses a transfer game button 52 on the slot machine 50. The slot machine 50 will now connect to the kiosk 10. A screen 54 on the slot machine 10 will show the same information as shown on the first screen 16 of the kiosk 10. The screen 54 may now be used to display the kiosk gaming information to the customer. In accordance with one embodiment, the screen 54 will show a main menu listing all the casino games that may be played on the casino kiosk 10. The user may select one or more games to play by using an input device 56. The input device 56 may be buttons on the slot machine 50, a keyboard, a mouse, roller ball, or the like. Alternatively, the screen 54 may have touch button features. The listing of the above is given as an example and should not be seen in a limiting manner.

After the customer selects a game to be played, and the playing options are entered, the slot machine 50 may dispense a game slip 58. The game slip 58 may have information such as but not limited to: betting amounts, the game played, numbers selected, and the like. This information may be printed on the game slip 58 or encoded as a bar code. The game slip 58 may further have a pin number. The customer may then take the game slip 58 when the customer leaves the slot machine 50. The game slip 58 may then be taken to the kiosk 10 and be used to collect his/her winnings. This may be done by entering the pin number into the kiosk 10 to see if he/she has won, inserting the game slip 58 into a reader in the kiosk 10 to see if he/she has won, etc.

In accordance with another embodiment, the customer may enter a telephone number via the input device 56. The kiosk 10 may then send a signal to the cellular phone 60 of the telephone number entered to inform the customer if he or she has won. Thus, the customer may leave the slot machine 50 and still be informed if he/she has won. In accordance with one embodiment, a text message is sent to the customer to inform the customer that he/she has won. The text message may include information such as the round the customer won, the dollar figure the customer has won, etc. The text message may further include a security number which the customer may be required to enter in order to receive his/her winnings.

If the customer receives a signal on his/her telephone of a winning round, the customer may return to the casino kiosk 10 to collect his/her winnings. The customer may collect his/her winning in different manners. For example, the game slip 58 may be inserted into the kiosk 10 to retrieve any winnings. The game slip 58 may be bar coded. The bar code is read by the kiosk 10 to verify a winning game slip 58. Alternatively, the customer may enter his/her telephone number into the kiosk 10. The customer may further be required to enter the security number that was sent in the text message and or printed on the game slip 58. The above information is entered into the kiosk 10 via the input device 18. Once the information is entered, the kiosk 10 will verify the information to determine if the customer had a winning round. If so, the casino kiosk 10 will issue either the monetary winnings or a voucher to turn into a cashier via a payout device 24.

In an alternative embodiment, once the customer presses a transfer game button 52 on the slot machine 50, the slot machine 50 will now connect to the kiosk 10. A screen 54 on the slot machine 10 will show the same information as shown on the first screen 16 of the kiosk 10. However, in this embodiment, the customer may only select a game to be played, and the playing options for the next round to be played. In this embodiment, winnings and losings (i.e., credits) will be added or subtracted from the credits on the slot machine 50.

In accordance with another embodiment, a customer may have a casino members card 58 which may be inserted into the slot machine 50. Customers place money bets for the games on the kiosk 10 on their casino member cards 58. If the casino member card 58 has no money left on it they can still place a wager by inserting cash into the slot machine 50.

An extra feature in the present embodiment is that after the bets for the kiosk game has been entered into the slot machine 50, the screen 54 may display a message asking the customer if he/she wishes to make a repeat bet. By touching an option button 56, the customer will automatically make the same bet for the next round (i.e., same game selected, same numbers, etc.).

In accordance with one embodiment, not departing from the spirit and scope of the present invention, embodiments of the invention may be used in a Mobile Live Video Stream Voting Kiosk Process and method. Alternatively, the Mobile Live Video Stream Voting Kiosk Process may be provided over the internet.

Embodiments of the invention may include a smart phone based voting application system that works with a web based content management system (CMS). It may be used simultaneously from multiple locations where the kiosk and the transmitter/responders positioned around a perimeter area where the kiosk is located.

This mobile live video stream voting kiosk embodiment streamlines the voting process by improving voting organization, participation, and enhancing data management. The mobile live video stream voting kiosk application ensures reliable, fast, and convenient voting/survey activities. It replaces manual voter verification with accurate automatic verification, and enhances voting verification accuracy and precision.

To be able to use the system Voters will have to go into an established voting poll station to sign up for the mobile live video stream voting kiosk application process. The application process requires verification having to show a government-issued photo ID for example. At the polling place, the Voters' signature will be compared to the signature on a voting card on file. If the signatures match, a registration agent will submit the Voter's information into a data base that qualifies the Voter to be able to cast a vote and use the voting kiosk app to follow votes on a phone.

At this time the Voter will be able to upload the mobile live video stream voting kiosk application web based CMS, data management and update applications. The applications automatically allow the Voter to access a protected CMS page on the web, where administrators can set the ballot for election positions and candidates running for those positions. The applications further allow the administrators to upload a voter list from pre-qualified registrants that will be compared with voter input on the Election Day for verification purposes.

On the day of election, qualified preregistered Voters can go to any place and location having a Mobile Live Video Stream Voting Kiosk. Once the Voter enters an identifier (a social security number or the like) into the Mobile Live Video Stream Voting Kiosk (alternatively referred to as a first confirmation), a standard typical ballot will greet the Voter. Next the Voter will see an electronic ballot that could depict virtual hanging chads or just hangs up with each name on the ballot having a unique alphanumeric code next to it. A1, for instance, could be George Bush, while A2 could be Al Gore.

After reviewing the ballot, the Voter may make a choice and vote by pressing the "Mobile Live Video Stream" button on the front of the Kiosk screen, which may be an LED screen, plasma screen, DLP screen, or the like. The listing of the above is provided as an example only and should not be seen in a limiting manner. In at least one embodiment, the Voter prints off the ballot and faces the camera holding up both the ballot and photo ID. An audible beep and an on-screen visual confirm the live stream is active, and a secondary visual confirms that the Voter's ID and ballot number have both been read via optical character and facial recognition (alternatively referred to as a second embodiment).

After a confirmation flash, the method may ask the Voter for a vote for the first ballot initiative by a recorded voice or other means, the vote for Governor for example. The Voter responds with either the candidate's name, a unique alphanumeric code, both or the like. The screen provides the visual appropriate candidate's name on the screen and asks the Voter to confirm the correct choice. If correct, the Voter responds in the affirmative, and the Voter is prompted (by voice for example) to the next ballot initiative. At the end of all initiatives, the system will ask the Voter to state the name given at the registration polling station and to affirm that the vote made has been cast at the voter's own initiative, without duress.

At this point the Mobile Live Video Stream Voting system will discontinue the live stream and reboot enabling next voter to log on to the Kiosk, at which time another live stream is initiated. To be able to keep track of the voting in real time as it's occurring, the Voter can use the Mobile Live Video Stream Voting Kiosk app that provides instant results as they're made, including the total number of voters, total number of votes for each candidate, and the like. Vote results can be viewed at the exact moment in time as votes are being made via a smart phone app.

In accordance with one embodiment, the Casino Kiosk and Notification Result Responder Device may be used in Lottery Kiosk in a similar manner in which it is used in the Combination Casino Slot/Kiosk and Notification Result Responder Device and methods for casino games. Once the software is installed in the Kiosk, cardholders can pick unlimited lottery number draws, withdraw cash, play the lottery or do both at legal established license holders lottery store where they would have to sign up for a lottery game account application.

Once a completed application is approved based on the Lottery stores criteria, a customer deposits money into their account using a credit or debit card, or go to any Lottery stores that have the mobile App sign-ups available to make a cash deposit. If a cardholder decides to play the lottery by using the Casino Kiosk and Notification Result Responder Device and methods, the lottery number picks are generated and a lottery ticket receipt is printed. In accordance with one embodiment, Customer "A" can input an identifier (a phone number for example) into the Lottery Kiosk to activate a down loadable video monitoring Lottery game viewer application that interconnects their mobile wireless smart phone device to the Live Lottery game taking place in real time.

Customer "A" can play interactively, watching the LIVE Lottery ball picks right from their own device using an electronic video monitoring application that allows them to see each and every spin and selection choice drawn during a LIVE Lottery Draw and cross check it with the numbers they picked. Customer "A" can turn on the Casino Kiosk and Notification Result Responder Device and methods app on his/her smart phone, laptop, tablet, computer and the like at any time to be able to activate and watch and observe computer generated LIVE LOTTERY game selection picks being drawn that they've Bet on in real time by activating the Lottery watch draw button on their smart phone's.

In accordance with one embodiment, the application used with the Casino Kiosk and Notification Result Responder Device and methods may include a text messaging application component can be used as a reverse 911 messaging system warning people of potential hazards or sharing general information with casino guests without departing from the spirit and scope of the present invention. Casinos can use the Casino Kiosk and Notification Result Responder Device and methods to warn guest of impending danger, alert them regarding evacuation situations, missing persons alerts, lookout for suspicious person alerts, player tracking, rewards & comps, player recognition, and communication technology prize give away, show times, show tickets left, gaming coupon give away, and the like.

Gaming customers can be notified and given information the casino management wants to share with casino customers who are signed up members using the smart phone game app when logged in. The app notification circuit can provide Visual, Text messaging, audible and or sensory indicator warnings such as lights as a means to inform casino guest with the Casino Kiosk and Notification Result Responder Device and methods app regarding their reverse 911 message alert system/casino information system for game application users.

In accordance with one embodiment, a Customer wanting to play the Casino Kiosk and Notification Result Responder Device and method game's available on the wireless smart phone network system or internet will have to go into an established gaming license Casino to sign up for the mobile wireless game account application process. Once a completed application is approved based on casino criteria, a customer may deposit money into their account making a cash advance on their credit or debit card, or go to any number of casino's with the mobile App sign-up locations to make a cash deposit.

Customer "A" can input an identifier (his/her phone number for example) into the Slot/Kiosk to activate a down loadable video monitoring viewer application that interconnects their mobile smart phone number to the computerized or Live Slot/Kiosk game taking place in real time. Users can log-in to their account via their smart phone app anywhere on or off the casino property to Bet Live or Bet on the Computerized Kiosk/Slot network system for games and touch deposit. A valid photo ID will be required and they may have to fill out a Form W-9 at the casino.

Alternatively, in accordance with embodiments of the invention a plurality of slot machines that are not connected to the Casino Kiosk 10 game network system can work in the following manner. Customer "A" decide to play the result responder walk n play game that allows the user to pick x amount of slot spins at whatever dollar amount you'd like to pay per each spin. For example: and not to be seen in a limiting manner. Customer "A" chooses a 100 spins at $5.00 a spin for a total of $500.

If Customer "A" have any money left on their slot machine prior to picking 100 spins for $5.00 a spin, that amount would be added to the total of the $500 cost to play 100 spins at $5.00. Customer "A" has $25 left on his/her machine but wants to play 100 spins at $5.00 a spin. He/she can put in $475 being that he/her has $25 dollars remaining on the slot machine before cashing out or he/her can put in $500 for a total of $525. This is decided and the money is entered in the slot machine and wagered on. A notification result responder device such as a casino club card, credit card, casino slot merchant card, or the like may be used to store the currency of the bet and what is left after the slot bets are done.

In accordance with one embodiment, a down loadable video monitoring slot game application for mobile wireless devices such as smart phones can be down loaded by Customer "A". In this manner Customer "A" can interactive bring the casino floor slot/kiosk game to their smart phone via an electronic video monitoring application that enables them to see each and every spin or game selection choice they've made on their own smart phone device.

Customer "A" may watch computerized or live rounds, slot spins etc, to see how much money they're winning or losing anywhere inside or outside the casino. "Customer "A" can turn on the Casino Kiosk and Notification Result Responder Device and Method application on his/her smart phone at any time to be able to activate and watch and observe computer generated or live casino game selection picks being played that they've Bet on in current time by pressing the play button on their smart phone.

Customer "A" can also stop the casino game activation on their mobiledevice at any time by pressing the stop button on the Casino Kiosk and Notification Result Responder Device and method application to stop the play until a later time and date at which time he/she can restart play again when he/she chooses to do so if he/she still has any money left on the casino gaming account.

In accordance with one embodiment relating to a plurality of free standing machines not connected to the Casino Kiosk 10 will be modified to allow users access to connect them to the slot machines CPU lines. The slot machine may have a gaming CPU line. The gaming CPU line is used to control the Slot machine. The gaming CPU Line is used to control all of the different Slot machine games that may be played on the Slot machine.

Alternatively, the CPU Line may be replaced by a plurality of game servers. Each game server may be used to control a particular casino game of the Slot machine. Each game server may be coupled to additional Slot machines. This may allow multiple Slot games to be linked together which allows for progressive jackpots to be awarded for the different Slot games based on the Slot selected criteria. If the game servers are used, then the game servers may be stored in secure area of the site or off site and coupled to a gaming server in the slot machine.

Once Customer "A" chooses to continue play after getting off the slot machine they're on will still be able to access the same slot machines CPU line via their smart phone app that allows them to continue play through the Casino Kiosk and Notification Result Responder Device and methods which allows them to keep playing that particular slot machines CPU line. When Customer "A" gets up from the slot machine after placing all bets and receives a notification result responder device method tracker card or game slip to keep track of their winnings or losses. That given slot machine they just made their slot spin bets on which is computer generated would then go into a freeze hold state so no other customer would be able to access and play on that given slot machine until the previous player's slot spins were all used up or until he/she turned off their game app.

After the previous players pre-selected slot spins are used up, the slot machine they made their bets on would then unfreeze and become operational for whoever decides to sit down and play at that given slot machine. Not departing from the spirit and scope of the present invention, Customer "A" chooses to play the slot machine walk-n-play game that allows them to pick x amount of wagered spins for the result responder gaming method. When Customer "A" leaves the slot machine after placing all bets, they receive a notification result responder device, tracker card or game slip to keep track of their winnings or losses. That given slot machine would stay on its current CPU line and Customer "A" would now be switched over to a new activated CPU line created just for the gaming app to continue play on his/her own smart phone device while not locking up the slot machine they just got off.

Alternatively, in accordance to one embodiment, the Combination Casino Kiosk 10 and stationary slot machines may work as an alternative to one another. A customer playing on the slot machine wishing to switch over to the Casino Kiosk 10 game can press a transfer button going on the Casino Kiosk 10 circuitry system to play the Casino Kiosk 10 random game selections. If the customer wanted to stay on the same slot machine circuitry for slot spins regarding that machine, they can press a non-transfer button to keep playing the same slot spins on that particular slot machines CPU instead of transferring over to the Casino Kiosk 10 CPU.

In accordance with one embodiment, the casino can segment a room of any size inside or outside of the casino, housing a virtual casino. A listing of various casino games can be played from a virtual pickup game room stationed inside or outside of the casino or anywhere in the United States. The customer goes to the counter and state's the type of game/games they'd like to play and how many rounds, slot spins etc. The customer would provide their notification result responder casino club card, credit card, casino slot merchant card, or the like to the person at the counter who would take their wager and activate their notification result responder device.

One embodiment may be used in a walk in transit station where customers walk up to the counter and pick the games they want to wager on. The customers may track their results via their mobile devices while being able to be miles away from the walk-n-transit station they originated their play from. This would provide savings in floor space for the casino as any given number of walk in transit station rooms could exist inside or outside the casino where customers just walk up and give attendants their game selection picks and then be able to leave and watch the games selected for the chance to gamble virtually on their smart phone versus sitting down to do so.

Alternatively, in accordance with one embodiment, the notification result responder device, such as a casino club card, credit card, casino slot merchant card, or the like, may be used in conjunction with the currently used casino club card for points system. For example, each licensed merchant store owners business in the casino would be required to accept the result responder notification casino slot merchant card, or the like when customers came in to use it for purchases at their store/business. As money would be transferred onto the casino slot merchant cards for customers wishing to play the notification result responder walk-n-play games.

Whatever amount of money customers would have left on those cards could be used at any licensed merchant store owners business. Casino owners could charge a little less for lease space but assess a casino owner's sur-charge fee of approximately 2 to 3 percent for every casino slot merchant card holder that uses the casino's slot merchant card in the lease holders business.

With so many people playing the virtual Casino Kiosk and Notification Result Responder Device and method with real money on their casino slot merchant cards, a casino could tap into every licensed business within its four walls by creating a walking casino banking roving system due to the new Casino Kiosk and Notification Result Responder Device and methods gaming system. This would enable the casino to collect a small portion of the revenue from each lease holder businesses because the new Casino Kiosk and Notification Result Responder Device and method would provide customers with cash on a card.

In accordance with one embodiment, Customer "A" signs up for the available Casino Kiosk and Notification Result Responder Device and method games on their mobile device or enters an established gaming license Casino or the like to sign up for the mobile wireless game account. After completing the written application process including providing proof of age and other criteria, "Customer "A" gets approved.

Customers can sign up right at the registration counter in the casino or the like to use a biometric device machine for "Voice, Eye, and Finger Print" scan log-in requirements to be able to activate and use the Casino Kiosk and Notification Result Responder Device and method games on the Kiosk and Smart Phone app, Slot Machine, PC, I-Pad Tablets.

Customer "A" can activate his/her account by placing his/her fingertip on the Kiosk/Smart Phone, Slot Machine, PC, I-Pad Tablets area of the scanner. The scanner captures a picture of the fingerprint and compares it to the one stored in a database that was collected at the casino registration counter or the like when obtaining approved. If the fingerprint matches, the system provides access to the Casino Kiosk and Notification Result Responder Device and method games that will be granted.

Customer "A" can activate the facial scanning biometric device by using a camera or other device to take a picture of their face. The recognition software then compares the scanned face with a database of previous scans taken at the casino registration counter or the like, and searches for a match. A match grants access to the Casino Kiosk and Notification Result Responder Device and methods for playing games on the Kiosk, Smart Phone app, Slot Machine, PC, I-Pad Tablets.

Customer "A" can activate the biometric voice recognition process, by speaking a specific word or combination of words into a microphone at the casino registration counter or the like when signing up for an account. The system converts the sounds to a digital map. The system uses the digital map to compare to a previously stored digital map.

Customer "A" would only be able to log-on the Casino Kiosk or Smart Phone app, Slot Machine, PC, I-Pad Tablets by using any combination of the above mentioned Biometric scan device systems to identify and verify the legal age of each individual. Passwords or pin codes can be forgotten or lost, yet identification through a physiological trait is a fool-proof security and verification method.

In accordance with one embodiment, not departing from the spirit and scope of the present invention, the COMBINATION CASINO KIOSK AND NOTIFICATION RESULT RESPONDER DEVICE AND METHOD THEREFOR may be used in Live Poker Tournaments along with any other type of electronic Poker game that uses game servers.

Alternatively in accordance with one embodiment, the Combination Casino Kiosk and Notification Result Responder Device and Method Therefore will be used in the following way. Bet The Next Hand Poker Tournament starts with a room of players playing at a table for a Grand Prize that can be monitored for making gaming bets via live video screens shown on Kiosk, Smart Phone app, Slot Machine's, PC's, I-Pad Tablets in real time.

Inside a casino or the like can have video screens located throughout the Casino or the like showing the Live Video Feed of the Bet The Next Hand Poker Tournament or the like. Customer "A" picks one player from the table of the Live Poker Tournament players to bet alongside with using their Smart Phone app, PC's, I-Pad Tablets etc. as the Live Poker Tournament person they've picked makes their bet or pass per their turn in the game.

Customer "A" will only be able to see all the cards dealt to the player he/she has selected and chosen to bet alongside of in the Bet The Next Hand Poker Tournament via his/her Smart Phone app, PC's, I-Pad Tablet. Customer "A" will not be able to see all the cards of other players hands in the game except for their face up cards that will be showing on the Live Video Feed screen on their Smart Phone app, PC's, I-Pad Tablet or Casino Video Screen.

Bet The Next Hand Poker Tournament app will show the seating arrangements of the people who are playing in the Live Bet The Next Hand Poker Tournament in real time. Customer "A" can pick or select any seat where a Live Player is shown seated at the Poker Table with the use of the app on their Smart Phone app, PC's, I-Pad Tablet where their selected player is seated to bet alongside of him/her who are seated next to other numbered players who are real persons in the Live Video Poker game.

Customer "A" will make a bet as one of a few ways. He/She will have to hit Play or Fold on their Smart Phone app, PC's, I-Pad Tablet before the player they've selected to play alongside of makes his/her Live bet in order to win the wagered amount they bet on for that Live hand by picking Play, Hold or Fold correctly of what their selected player chose to do that hand before he/she makes their bet.

For example, Customer "A" see's their selected player's cards and all the other player's face cards via the live video screen on their Smart Phone app, PC', I-Pad Tablet and thinks his/her selected player is going to fold so they wager $50 on that choice. The selected player chooses to play instead of fold so Customer "A" looses $50 that hand via the amount of money they have on their casino account. The above are given as examples and should not be seen in a limiting manner.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A method for voting using a gaming system comprising:
- a kiosk, wherein the kiosk comprises:
- an input device for selecting a casino game to be played via the gaming kiosk, gaming rounds to be played, and game criteria; and
- a dispenser for distributing a result responder;
- a transmitter device for transmitting game notification signals to at least the result responder to indicate at least one of a winning or losing round by a player, the gaming system having software stored on a non-transitory computer-readable medium which, when loaded and run by the processor, causes the processor to perform the steps of:
- qualifying at least one voter to vote using the gaming system;
- enabling the at least one voter to enter at least one initiative on at least one ballot;
- providing more than one confirmation of the at least one voter.

2. The method of claim 1 further comprising registering the at least one voter to vote using the gaming system.

3. The method of claim 1 wherein the confirmation comprises enabling the at least one voter to enter an identifier.

4. The method of claim 3 wherein the confirmation further comprises confirming at least one voter identification and a ballot.

5. The method of claim 3 wherein the confirmation further comprises the at least one voter providing their name to affirm a vote made.

6. The method of claim 1 further comprising providing the ballot in an electronic format at the kiosk.

7. The method of claim 1 further comprising enabling the voter to download an app enabling the voter to monitor voting results in real time.

8. A method for voting using a gaming system comprising:
- a kiosk, wherein the kiosk comprises:
- an input device for selecting a casino game to be played via the gaming kiosk, gaming rounds to be played, and game criteria; and
- a dispenser for distributing a result responder;
- a transmitter device for transmitting game notification signals to at least the result responder to indicate at least one of a winning or losing round by a player, the gaming system having software stored on a non-transitory computer-readable medium which, when loaded and run by the processor, causes the processor to perform the steps of:
- registering the at least one voter to vote using the gaming system;
- qualifying at least one voter to vote using the gaming system;
- enabling the at least one voter to enter at least one initiative on at least one ballot;
- providing at least two confirmations of the at least one voter.

9. The method of claim 8 wherein the confirmation comprises enabling the at least one voter to enter an identifier.

10. The method of claim 9 wherein the confirmation further comprises confirming at least one of a voter identification and a ballot.

11. The method of claim 9 wherein the confirmation further comprises the voter providing their name to affirm a vote made.

12. The method of claim 8 further comprising providing the ballot in an electronic format at the kiosk.

13. The method of claim 8 further comprising enabling the voter to download an app enabling the voter to monitor voting results in real time.

14. A method for gambling using a gaming system comprising:
- a kiosk, wherein the kiosk comprises:
- an input device for selecting a casino game to be played via the gaming kiosk, gaming rounds to be played, and game criteria; and
- a dispenser for distributing a result responder;
- a transmitter device for transmitting game notification signals to at least the result responder to indicate at least one of a winning or losing round by a player, the gaming system having software stored on a non-transitory computer-readable medium which, when loaded and run by the processor, causes the processor to perform the steps of:
- qualifying at least one player to gamble using the gaming system;
- enabling the at least one player to deposit money into a financial account; and
- enabling the at least one player to gamble using the gambling device.

15. The method of claim 14 wherein the gambling comprises at least one of playing lottery and playing a casino game.

* * * * *